United States Patent
Bening et al.

(10) Patent No.: US 6,867,264 B2
(45) Date of Patent: Mar. 15, 2005

(54) PROCESS FOR REMOVING RESIDUAL SILICON SPECIES FROM HYDROCARBON SOLVENTS

(75) Inventors: Robert C. Bening, Katy, TX (US); Zaida Diaz, Houston, TX (US)

(73) Assignee: KRATON Polymers U.S. LLC, Houston, TX (US)

( * ) Notice: Subject to any disclaimer, the term of this patent is extended or adjusted under 35 U.S.C. 154(b) by 0 days.

(21) Appl. No.: 10/229,876

(22) Filed: Aug. 28, 2002

(65) Prior Publication Data

US 2004/0044137 A1 Mar. 4, 2004

(51) Int. Cl.[7] .......................... C08F 236/06; C08F 8/36
(52) U.S. Cl. ................. 525/331.9; 525/333.2; 525/344
(58) Field of Search ............. 525/331.9, 333.2, 525/344, 355, 358.1, 359, 236, 271, 250

(56) References Cited

U.S. PATENT DOCUMENTS

| | | |
|---|---|---|
| 4,210,496 A | 7/1980 | Wong |
| 4,370,204 A | 1/1983 | Kotzsch et al. |
| 4,774,346 A | 9/1988 | Imai et al. |
| 4,851,476 A | 7/1989 | Willis |
| 5,336,726 A | 8/1994 | DuBois |
| 5,376,745 A | 12/1994 | Handlin, Jr. et al. |
| 5,391,663 A | 2/1995 | Bening et al. |
| 5,393,843 A | 2/1995 | Handlin, Jr. et al. |
| 5,416,168 A | 5/1995 | Willis et al. |
| 5,612,435 A | 3/1997 | Bening et al. |
| 5,654,371 A | 8/1997 | Schwindeman et al. |
| 5,780,551 A | 7/1998 | Engel et al. |
| 5,792,815 A | 8/1998 | Schwindeman et al. |
| 5,910,547 A | 6/1999 | Schwindeman et al. |
| 5,948,863 A | 9/1999 | St. Clair et al. |
| 5,965,681 A | 10/1999 | Schwindeman et al. |
| 6,107,414 A | 8/2000 | Schwindeman et al. |
| 6,160,054 A | 12/2000 | Schwindeman et al. |
| 6,184,309 B1 * | 2/2001 | Schwindeman et al. .... 525/355 |
| 6,362,284 B1 | 3/2002 | Schwindeman et al. |

* cited by examiner

Primary Examiner—Robert D. Harlan

(57) ABSTRACT

Removing silicon species from hydrocarbon solvents such as cyclohexane. The process comprises contacting the hydrocarbon solvent with sulfuric acid in an amount sufficient to phase separate the silicon species and removing at least 20% by weight of the residual silicon species from the hydrocarbon solvent. The hydrocarbon solvent may be a polymerization solvent containing residual silicon species, and more than 80% by weight of the silicon species can be removed.

15 Claims, No Drawings

PROCESS FOR REMOVING RESIDUAL SILICON SPECIES FROM HYDROCARBON SOLVENTS

BACKGROUND OF THE INVENTION

1. Field of the Invention

The present invention relates to a process for removing silicon compounds from hydrocarbon solvents. More particularly, the invention relates to a process for removing residual silicon species from polymerization solvents.

2. Background of the Related Art

Solvents containing silicon compounds are by-products of polymerization processes for making telechelic polymers and also by-products of other manufacturing processes. Telechelic polymers include diols, triols and star polyols, which have found wide utility in many applications. Telechelic polymers have been employed as rocket fuel binders, in coatings and sealants and in adhesives, and can be co-polymerized with appropriate materials to form polyesters, polycarbonates, and polyamides.

In a typical polymerization process of telechelic polymers, a silicon compound is added to a diene monomer in a hydrocarbon solvent to initiate polymerization of the diene compound. A structure modifier may also be present. After polymerization is complete, a capping agent such as ethylene oxide may be added to introduce a terminal functional group. The polymer is optionally hydrogenated to reduce unsaturation. The resulting silicon compound such as a silyl ether is then hydrolyzed in the presence of an acid, and optionally an alcohol, to produce the desired telechelic polymer. During hydrolysis, residual silicon species are formed as by-products at lower concentrations either as impurities in the initiator, die-out products of the initiator, or side products of the hydrolysis. These residual silicon species can interfere with polymerization and, therefore, should be removed from the solvent before recycling the solvent for polymerization.

There remains a need to efficiently separate residual silicon species from hydrocarbon solvents. Using distillation to separate organic solvents from residual silicon species is difficult since the boiling points of the residual silicon species and solvents are only a few degrees apart. Direct distillation also incurs the risk of entraining other contaminants, like nitrogen compounds or sulfurous compounds, into the distillate.

SUMMARY OF THE INVENTION

The present invention generally provides a process for removing residual silicon species from hydrocarbon solvents by adding sulfuric acid and separating an organic phase from a silicon containing aqueous phase. The process is useful for recovering solvent after producing telechelic polymers by polymerizing a monomer in a hydrocarbon solvent with a silicon compound. After the hydrocarbon solvent is separated from the polymer cement, the hydrocarbon solvent is purified by adding sulfuric acid to the solvent and separating a hydrocarbon phase from an aqueous acid phase that contains the residual silicon species. The hydrocarbon solvent is recovered and recycled to the polymerization process.

DETAILED DESCRIPTION OF THE PREFERRED EMBODIMENT

Telechelic polymers can be made using a lithium initiator that contains a hydroxyl group which has been blocked as the silyl ether. Details of the polymerization procedure can be found in U.S. Pat. No. 5,376,745, which is herein incorporated by reference. The monomer(s) to be anionically polymerized can be selected from any suitable monomer capable of anionic polymerization, including conjugated alkadienes, alkenyl-substituted aromatic hydrocarbons, and mixtures thereof. The conjugated alkadienes may be polymerized alone, or in admixture with each other or with alkenyl-substituted aromatic hydrocarbons to form random copolymers, or by charging the conjugated alkadienes to the reaction mixture sequentially, either with each other or with alkenyl-substituted aromatic hydrocarbons, to form block copolymers.

Examples of conjugated alkadiene hydrocarbons include, but are not limited to, 1,3-butadiene, isoprene, 2,3-dimethyl-1,3-butadiene, 1,3-pentadiene, myrcene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, and 2-methyl-3-isopropyl-1,3-butadiene. Examples of alkenyl-substituted aromatic hydrocarbons include, but are not limited to, styrene, alpha-methylstyrene, vinyltoluene, 2-vinylpyridine, 4-vinylpyridine, 1-vinylnaphthalene, 2-vinylnaphthalene, 1-alpha-ethylvinylnaphthalene, 2-alpha-methylvinylnaphathalene, 1,2-diphenyl-4-methyl-1-hexene and mixtures of these, as well as alkyl, cycloalkyl, aryl, alkaryl, and aralkyl derivatives thereof in which the total number of carbon atoms in the combined hydrocarbon constituents is generally not greater than 18. Examples of these latter compounds include; 3-methylstyrene, 3,5-diethylstyrene, 2-ethyl-4-benzylstyrene, 4-phenylstyrene, 4-p-tolylstyrene, 2,4-divinyltoluene, and 4,5-dimethyl-1-vinylnaphthalene. Reference is made to U.S. Pat. No. 3,377,404 for disclosures of additional alkenyl substituted aromatic compounds. As used herein, the reference to mixtures of monomers refers to mixtures of conjugated alkadienes, mixtures of alkenyl-substituted aromatic hydrocarbons, and mixtures of one or more conjugated alkadienes with one or more alkenyl-substituted aromatic hydrocarbons.

The polymerization solvent is preferably an inert, non-polar hydrocarbon hydrocarbon solvent. Inert hydrocarbon solvents useful in practicing this invention comprise alkanes and cycloalkanes containing five to ten carbon atoms such as pentane, hexane, cyclohexane, methylcyclohexane, heptane, methylcycloheptane, octane, decane and so forth, and aromatic solvents containing six to ten carbon atoms such as benzene, toluene, ethylbenzene, p-xylene, m-xylene, o-xylene, n-propylbenzene, isopropylbenzene, n-butylbenzene, and the like.

When the conjugated alkadiene is 1,3-butadiene and when the resulting polymer will be hydrogenated, the anionic polymerization of butadiene in a hydrocarbon solvent like cyclohexane is typically controlled with structure modifiers, such as diethylether, glyme (1,2-diethoxyethane), or o-dimethoxybenzene to obtain the desired vinyl content. O-dimethoxybenzene is the preferred structure modifier. As described in U.S. Pat. No. Re 27,145 which is incorporated by reference herein, the level of 1,2-addition of butadiene in the polymer or copolymer can greatly affect viscosity and elastomeric properties after hydrogenation.

Anionic polymerization may be terminated by addition of a proton donor such as water to remove the lithium as lithium hydroxide (LiOH) or an alcohol (ROH) to remove the lithium as a lithium alkoxide (LiOR). Polymers terminated in this way will be mono-hydroxy functional (monools) after removal of the silyl protecting group. Polymers having an additional terminal functional groups are prepared by terminating with hydroxyl, carboxyl, phenol, epoxy, or amine groups by reaction with ethylene oxide, oxetane, 2,2-dimethyloxetane, carbon dioxide, a protected hydroxystyrene monomer, ethylene oxide plus epichlorohydrin, or the amine compounds listed in U.S. Pat. No. 4,791,174, respectively, which is incorporated by reference herein.

If desired, the polymer can be hydrogenated. Hydrogenation may be carried out by a variety of well established processes including hydrogenation in the presence of such catalysts as Raney Nickel, nobel metals such as platinum and the like, soluble transition metal catalysts and titanium catalysts as in U.S. Pat. No. 5,039,755, which is incorporated by reference. Examples of methods to hydrogenate the polymers of this invention are described in U.S. Pat. Nos. 4,970,254, 5,166,277, 5,393,843 and 5,496,898. The hydrogenation of the functionalized polymer is conducted in situ, or in a suitable solvent, such as hexane, cyclohexane, or heptane. This solution is contacted with hydrogen gas in the presence of a catalyst, such as a nickel catalyst. A particularly preferred catalyst is nickel aluminum such as a mixture of nickel 2-ethylhexanoate and triethylaluminum. The hydrogenation is typically performed at temperatures from 25° C. to 150° C., with a typical hydrogen pressure of 15 psig to 1000 psig. The hydrogenation reaction can be conducted until at least 90% of the aliphatic unsaturation has been saturated. The hydrogenated functional polymer can then be recovered by conventional procedures, such as removal of the catalyst with aqueous acid wash, followed by solvent removal or precipitation of the polymer. Because the polymers may have different diene blocks, these diene blocks may be selectively hydrogenated as described in U.S. Pat. Nos. 5,229,464 and Re 27,145, which are also incorporated by reference herein.

After polymerization and, optionally, hydrogenation and washing of the polymer, the hydroyl functionality on the blocked end of the polymer is obtained by cleaving the silyl ether by hydrolysis. This step is often referred to as deprotection. A variety of processes for removal of the silyl protecting group are known; for a review, see T. W. Greene, "Protective Groups in Organic Synthesis", J. Wiley and Sons, New York, 1981. An acceptable acid catalyst for performing the hydrolysis of the polyether is methane sulfonic acid (MSA), delivered to the polymer cement in a solution containing amyl alcohol and water.

Residual silicon species are formed by the deprotection reaction. The residual silicon species contain trimethyl silane (TMS) functionality, and their form depends on the deprotecting agents used. During acid catalyzed hydrolysis, hexamethyldisiloxane (HMDS) is the primary residual silicon species. Other residual silicon species, such as neopentoxy trimethyl silane, n-pentoxy trimethyl silane and trimethylsilanol, are also present at lower levels, either as impurities in the initiator, die-out products of the initiator, or side products of the hydrolysis reaction. These species may contribute as much as 5000 ppm of silicon to the resulting cement.

Following the reaction, the MSA is removed from the polymer cement. Removal can be accomplished by extracting the MSA into a pure water phase. After the water wash, the hydrocarbon solvent, amyl alcohol, and the TMS byproducts are evaporated to produce neat polymer. The neat polymer can be re-dissolved in cyclohexane and treated with the acid solution a second time to improve the percentage of hydrolysis and again then the polymer recovered.

The evaporated solvent containing amyl alcohol, water, and the TMS byproducts must be purified before re-used in the polymerization process. Purification of the solvent may occur by contacting the solvent with aqueous sulfuric acid. The aqueous sulfuric acid solution contains 70% or more by weight sulfuric acid. Preferably, the aqueous sulfuric acid solution contains 90% or more by weight sulfuric acid.

During the purification process, the acid reacts with the TMS groups forming an aqueous phase and organic phase. The TMS-sulfates dissolve in the aqueous phase and the aqueous phase can then be separated from the hydrocarbon solvent by conventional methods such as settling and decanting, or centrifuging. After separation, the aqueous phase can be recovered or reacted with caustic for disposal.

The conjugated alkadiene polymers produced as described above have the conventional utilities for terminally functionalized polymers of such as forming adhesives, coatings, and sealants. Additionally, the polymers may be used to modify polyurethanes, polyesters, polyamides, polycarbonates, and epoxy resins.

In a preferred embodiment of the invention, 1,3-butadiene is polymerized with a trimethylsilyloxy lithium compound in cyclohexane. The structure modifier o-dimethoxybenzene is added to produce the desired vinyl content. After polymerization is complete, ethylene oxide is added to introduce the terminal hydroxyl group. The polymer is hydrogenated using a mixture of triethylaluminum and nickel 2-ethylhexanoate, and the cement is washed with dilute phosphoric acid to remove the catalyst. The polymer cement is then concentrated to 40% solids. The trimethylsilyl ether of the resulting polymer is hydrolyzed to "deprotect" the masked hydroxyl group. A solution of methanesulfonic acid (MSA) and water in amyl alcohol is added to the cement to effect the hydrolysis. The major product of hydrolysis is hexamethyldisiloxane (HMDS). Other silyloxy species, such as neopentoxy trimethyl silane, n-pentoxy trimethyl silane and trimethylsilanol, are also present. The solvent containing the residual silicon species is then separated by evaporation, and the residual silicon species are removed by contacting with sulfuric acid having a concentration of 90% weight or more.

Experiments were performed to assess the sulfuric acid concentration range over which extraction occurs. The experiments tested the rate of extraction under various conditions, the capacity of sulfuric acid for removing silicon from the organic phase, and the recovery of silicon from sulfuric acid. Most of this work was done using prepared mixtures of hexamethyldisiloxane (HMDS), neopentoxy trimethyl silane (H-PFI) and 2-ethylhexanol (2-EH). The prepared mixtures simulate residual silicon species in the preferred embodiment of the invention.

Total silicon was measured by Direct Injection Ion Coupled Plasma (ICP), while individual silicon-containing species were identified and quantitated by H-NMR. Total silicon calculated from NMR data was generally in good agreement with the values measured by ICP.

The following examples are presented to illustrate certain specific embodiments of the present invention but are not to be considered limitative thereto.

EXAMPLE 1

To determine the minimum sulfuric acid concentration for effective extraction, 5.0 gram aliquots of a 1000 ppm solution of HMDS in cyclohexane (CH) were place in an 8 oz. bottle along with 20 grams of sulfuric acid at the following concentrations (% wt.): 10%, 30%, 50%, 70%, 80%, 90%.

Bottles were shaken for 15 minutes at room temperature. After settling for 30 seconds, a sample of the organic layer was removed and analyzed by ICP. No extraction occurred at less than 70% and extraction was less than half as complete at 80% than 90%. This data suggests that the concentration of sulfuric acid is preferably maintained at no less than 90% wt.

This data is summarized in Table 1 which depicts the effect of acid strength on hexamethyldisiloxane removal.

TABLE 1

| SULFURIC ACID, wt % | HEXAMETHYL DISILOXANE, ppm |
|---|---|
| 0 | 1028 |
| 10 | 1017 |
| 30 | 1025 |
| 50 | 1030 |
| 70 | 856 |
| 80 | 323 |
| 90 | 0 |

EXAMPLE 2

To determine the effect temperature and agitation have on the rate of removal of silicon compounds from a model overhead stream, 300 grams of H-PFI (4% wt.), HMDS (0.05% wt.) and 2-EH (0.05% wt.) in cyclohexane was contacted with 30 grams of concentrated sulfuric acid (90% wt.) in a 1 liter resin kettle. The 2-EH was added to help determine the fate of hydroxyl components in the stream. A hydroxyl degradation product of the PFI, TMS-CH2—C(CH3)2—CH2—OH (designated "SiC") was of particular interest. Although this material was present at low levels, it has no Si—O bonds, and may not be removed under conditions that remove HMDS and H-PFI. In addition to following total silicon by Ion Coupled Plasma (ICP), H-NMR was used to follow levels of individual species, as well as detect any new silicon-containing species; X-Ray Fluorescence (XRF) was used to analyze for sulfur.

The solution was shaken with concentrated sulfuric acid at room temperature and the changes in composition were followed for contact times from 5–60 minutes. Within 5 minutes, the level of HMDS was reduced by over 80% and H-PFI and 2-EH were reduced to undetectable levels. The absence of 2-EH suggests that species such as "SiC" would also be removed. High extraction efficiencies can be achieved with a single contact at quite a low acid:cement ratio.

Temperature and mixing conditions will influence the rate and efficiency of extraction. A model solution containing the components described above was contacted with sulfuric acid (10:1 cement:acid) at either room temperature or 50° C., and either 200 rpm or 800 rpm.

At 200 rpm, there was very little phase mixing. Even under these conditions, greater than 90% of the silicon was removed after 1 hour. At 800 rpm, extraction was complete in 5 minutes. The distribution of species as measured by NMR was quantitatively similar to what was observed in the previous experiment. At equilibrium, HMDS is the only silicon containing species present at observable levels. Silicon levels, especially at later times, are near the detection limit of the NMR technique, thus ICP provides a better measure of the total silicon. Using the ICP values, a slightly higher extraction coefficient (ca. 150–200) was measured than was obtained for the higher-silicon feed in the previous experiment. It is not clear if the very high extraction efficiency observed at room temperature/200 rpm is real, although low rpm and temperature probably help minimize the dissolution of silyl sulfates. The sulfate level in these samples by XRF is fairly low (<50 ppm). The samples prepared at high stir rates exhibited substantial settling before analysis for sulfates could be performed, which would have made the results suspect. The extraction is reasonably fast, and efficient over a range of contacting conditions.

EXAMPLE 3

Another quantity of interest is the capacity of sulfuric acid for silicon removal, that is, the quantity of silicon a given quantity of sulfuric acid can absorb before losing the capacity for further extraction. To investigate this, a 2 gram aliquot of 97% wt. sulfuric acid was contacted with from 1 to 12 aliquots (20 g each) of a cyclohexane solution containing 1.2% wt H-PFI, 0.24% wt HMDS and 0.15% 2-EH. Acid and hydrocarbon solutions were shaken together for 5 minutes. Variations in the silicon content and product distribution in the organic phase were determined after each contact. The organic layer was then removed by settling and decanting and retained for NMR analysis. Silicon was not significantly removed when more than 3 aliquots of the cyclohexane solution were contacted with the acid. These results are summarized in Table 3 which illustrates that removal of about 90% of silicon from the organic phase can be achieved in a single stage contact provided sufficient sulfuric acid is added to insure at least 100 grams of $H_2SO_4$ per 3 grams of silicon.

TABLE 3

| Silicon Species | 1 | 2 | 3 | 4 |
|---|---|---|---|---|
| H-PFI, wt % | 0 | 0.2 | 0.2 | 0 |
| HMDS, wt % | 0.05 | 0.16 | 0.32 | 0.53 |
| 2-EH, wt % | 0 | 0 | 0 | 0 |
| TMS-SO4, wt % | 0.09 | 0.25 | 0.44 | 0.43 |
| NP-SO4, wt % | 0.01 | 0.12 | 0.27 | 0.22 |
| Si remaining, wt % | 0.038 | 0.117 | 0.216 | 0.283 |
| Si added, g/g acid | 0.0275 | 0.055 | 0.0825 | 0.110 |
| Si removed, % | 86.1 | 57.6 | 21.5 | ~0 |

While foregoing is directed to the preferred embodiment of the present invention, other and further embodiments of the invention may be devised without departing from the basic scope thereof, and the scope thereof is determined by the claims that follow.

What is claimed is:

1. A process for producing a polymer comprising:
   polymerizing a conjugated alkadiene in a hydrocarbon solvent with an initiator comprising silicon;
   separating the hydrocarbon solvent from a finished polymer;
   adding sulfuric acid to the hydrocarbon solvent in an amount sufficient to phase separate residual silicon species; and
   removing at least 20% by weight of the residual silicon species from the hydrocarbon solvent.

2. The process of claim 1 wherein the finished polymer is hydrogenated.

3. The process of claim 1, wherein the hydrocarbon solvent comprises liquid alkanes, cycloalkanes, or aromatics.

4. The process of claim 1, wherein sulfuric acid is added at a concentration of 90% by weight or more.

5. The process of claim 1, wherein the conjugated alkadiene is butadiene.

6. The process of claim 1, wherein the residual silicon species comprises hexamethyldisiloxane, neopentoxy trimethyl silane, n-pentoxy trimethyl silane, or trimethylsilanol.

7. The process of claim 1, wherein the residual silicon species comprises hexamethyldisiloxane.

8. The process of claim 1, wherein at least 80% by weight of the residual silicon species is removed.

9. The process of claim 1, wherein the finished polymer is a diol.

10. A process for removing silicon species from a hydrocarbon solvent, comprising:

contacting the hydrocarbon solvent with aqueous sulfuric acid in an amount sufficient to phase separate the hydrocarbon solvent from the silicon species; and removing at least 20% by weight of the silicon species from the hydrocarbon solvent.

11. The process of claim 10, wherein the hydrocarbon solvent comprises liquid alkanes, cycloalkanes, or aromatics.

12. The process of claim 10, wherein the hydrocarbon solvent comprises cyclohexane.

13. The process of claim 10, wherein the residual silicon species comprises hexamethyldisiloxane, neopentoxy trimethyl silane, n-pentoxy trimethyl silane, or trimethylsilanol.

14. The process of claim 10, wherein the residual silicon species comprises hexamethyldisiloxane.

15. The process of claim 10, wherein the concentration of the aqueous sulfuric acid is about 90% by weight or more and at least 80% by weight of the silicon is removed.

* * * * *